United States Patent
Sousa

(10) Patent No.: US 7,525,562 B2
(45) Date of Patent: Apr. 28, 2009

(54) GRAPHIC-ARTS LASER IMAGING WITH REDUCED-LENGTH LASER CAVITIES AND IMPROVED PERFORMANCE

(75) Inventor: John Gary Sousa, Hudson, NH (US)

(73) Assignee: Presstek, Inc., Hudson, NH (US)

( * ) Notice: Subject to any disclaimer, the term of this patent is extended or adjusted under 35 U.S.C. 154(b) by 55 days.

(21) Appl. No.: 11/121,310

(22) Filed: May 3, 2005

(65) Prior Publication Data
US 2005/0257708 A1 Nov. 24, 2005

Related U.S. Application Data

(60) Provisional application No. 60/568,343, filed on May 5, 2004.

(51) Int. Cl.
*B41J 2/45* (2006.01)
*H01S 3/08* (2006.01)
(52) U.S. Cl. .................................. 347/238; 372/103
(58) Field of Classification Search ............ 372/18–21, 372/29.022, 44.011, 68–72, 36, 108, 22, 372/41, 44.01, 92, 95, 98–99, 103–106; 359/328; 219/121.72; 347/132, 237, 238, 247
See application file for complete search history.

(56) References Cited

U.S. PATENT DOCUMENTS

| | | | |
|---|---|---|---|
| 5,050,179 A * | 9/1991 | Mooradian ............... | 372/44.01 |
| 5,317,447 A * | 5/1994 | Baird et al. ................. | 359/328 |
| 5,410,559 A * | 4/1995 | Nighan et al. .................. | 372/19 |
| 5,557,630 A * | 9/1996 | Scaggs ........................ | 372/95 |
| 5,651,022 A | 7/1997 | Anthon et al. | |
| 5,682,397 A * | 10/1997 | Scheps ......................... | 372/22 |
| 5,745,511 A * | 4/1998 | Leger .......................... | 372/19 |
| 5,822,345 A | 10/1998 | Sousa et al. | |
| 5,886,320 A * | 3/1999 | Gallo et al. ............ | 219/121.72 |
| 5,907,570 A * | 5/1999 | Nighan et al. ................. | 372/41 |
| 6,101,201 A * | 8/2000 | Hargis et al. .................. | 372/36 |
| 6,163,558 A * | 12/2000 | Hiiro ........................... | 372/99 |
| 6,373,868 B1 | 4/2002 | Zhang | |
| 6,711,203 B1 | 3/2004 | Garnache et al. | |
| 7,050,476 B2 * | 5/2006 | Baker ......................... | 372/92 |

FOREIGN PATENT DOCUMENTS

JP 2000249951 A * 9/2000

* cited by examiner

*Primary Examiner*—Hai C Pham
(74) *Attorney, Agent, or Firm*—Goodwin Procter LLP

(57) ABSTRACT

Cavity lasers exhibit a relatively high beam quality (e.g., $M^2 < 1.25$) despite a relatively small cavity length (e.g., 50-53 mm) for a high (e.g., $\geq 10$ watt) output power device. This enables the construction of physically smaller laser and optical assemblies without sacrificing performance. Reduction of optical photonic interference, which can impair imaging performance, is also facilitated. Laser and optical assemblies may utilize an aperture defined within an optical barrier element to reduce the divergence of the light beam emanating from a diode-pumping laser.

18 Claims, 1 Drawing Sheet

GRAPHIC-ARTS LASER IMAGING WITH REDUCED-LENGTH LASER CAVITIES AND IMPROVED PERFORMANCE

CROSS-REFERENCE TO RELATED APPLICATION

The present application claims priority to and the benefit of U.S. provisional application Ser. No. 60/568,343, filed on May 5, 2004, the disclosure of which being incorporated by reference herein.

FIELD OF THE INVENTION

The present invention relates generally to graphic-art imaging and more particularly to cavity laser optimizations used in lithographic imaging.

BACKGROUND OF THE INVENTION

In offset lithography, a printable image is present on a printing member as a pattern of ink-accepting (oleophilic) and ink-repellent (oleophobic) surface areas. Once applied to these areas, ink can be efficiently transferred to a recording medium in an imagewise pattern with substantial fidelity. Dry printing systems utilize printing members whose ink-repellent portions are sufficiently phobic to ink as to permit its direct application. Ink applied uniformly to the printing member is transferred to the recording medium in the imagewise pattern. Typically, the printing member first makes contact with a compliant intermediate surface called a blanket cylinder, which, in turn, applies the image to the paper or other recording medium. In typical sheet-fed press systems, the recording medium is pinned to an impression cylinder, which brings it into contact with the blanket cylinder.

In a wet lithographic system, the non-image areas are hydrophilic and the necessary ink-repellency is provided by an initial application of a dampening (or "fountain") solution to the plate prior to inking. The ink-adhesive fountain solution prevents ink from adhering to the non-image areas, but does not affect the oleophilic character of the image areas.

If a press is to print in more than one color, a separate printing member corresponding to each color is required. The original image is decomposed into imagewise patterns, or "separations," that each reflects the contribution of the corresponding printable color. The positions of the printing members are coordinated so that the color components printed by the different members will be in register on the printed copies. Each printing member ordinarily is mounted on (or integral with) a "plate" cylinder, and the set of cylinders associated with a particular color on a press is usually referred to as a printing station.

In most conventional presses, the printing stations are arranged in a straight or "in-line" configuration. Each such station typically includes an impression cylinder, a blanket cylinder, a plate cylinder and the necessary ink (and, in wet systems, dampening) assemblies. The recording material is transferred among the print stations sequentially, each station applying a different ink color to the material to produce a composite multi-color image. Another configuration, described in U.S. Pat. No. 4,936,211, relies on a central impression cylinder that carries a sheet of recording material past each print station, eliminating the need for mechanical transfer of the medium to each print station. With either type of press, the recording medium can be supplied to the print stations in the form of cut sheets or a continuous "web" of material.

o circumvent the cumbersome photographic development, plate-mounting and plate-registration operations that typify traditional printing technologies, practitioners have developed electronic alternatives that store the imagewise pattern in digital form and impress the pattern directly onto the plate. Plate-imaging devices amenable to computer control include various forms of lasers (e.g., cavity-type lasers). For example, U.S. Pat. Nos. 5,339,737; 5,351,617; 5,385,092; 5,822,345; and 5,990,925, the entirety of which are incorporated herein by reference, disclose ablative/sub-ablative recording systems that use laser discharges to remove, in an imagewise pattern, one or more layers of a lithographic printing blank, thereby creating a ready-to-ink printing member without the need for photographic development. In accordance with those systems, laser output is guided from a diode to a printing surface and focused onto that surface (or, desirably, onto a layer most susceptible to laser ablation, which will generally lie beneath the surface layer). Other systems use laser energy to cause transfer of material from a donor to an acceptor sheet, to record non-ablatively, or as a pointwise alternative to overall exposure through a photomask or negative.

A challenge in designing laser-based imaging systems is achieving a beam having a high degree of symmetry and energy concentration while minimizing cost and equipment footprint. In general, the output should be circular in nature and feature a single dominant peak. The degree to which actual output approaches the ideal of a diffraction-limited source can be quantified, and this quantity used to assess the quality of the output. In particular, the widely used M factor relates beam resolution to the ideal of a diffraction-limited source (i.e., the beam quality factor. $M^2=1$), where $M^2 = \theta D_0 \pi/4w_B$, $D_0$ is the diameter of the beam waist, $\theta$ is the beam divergence, and $w_B$ is the beam wavelength). The beam quality of a cavity laser, unfortunately, tends to vary with cavity length (for a given output power level)—the longer the cavity (and the larger the resulting laser assembly), the closer $M^2$ will be to unity and, consequently, the better the beam. What is needed, therefore, is a design that combines relatively high beam qualities with relatively short cavity lengths.

SUMMARY OF THE INVENTION

In accordance with the present invention, cavity lasers exhibit a relatively high beam quality (e.g., $M^2<1.25$) despite a relatively small cavity length (e.g., 50-53 mm) for a high (e.g., $\geq 10$ watt) output power device. This enables the construction of physically smaller laser and optical assemblies without sacrificing performance. The present invention also facilitates reduction of optical photonic interference, which can impair imaging performance. In one illustrative embodiment, laser and optical assemblies utilize an aperture defined within an optical barrier element to reduce the divergence of the light beam emanating from a diode-pumping laser. This divergence-reduced light beam is further focused onto a "host" laser crystal (e.g., $Nd:YVO_4$, $Nd:GdVO_4$, Nd:YLF, Nd:YAG) with a relatively reduced dopant level (e.g., about 0.2-0.5%) so as to reduce the amount of bulk tensing occurring therein. This reduced doping level allows the absorption of the pump energy to take place over a longer length of the crystal, resulting in a more uniform crystal heating. The size of the aperture, coupled with the reduced crystal doping level reduces the effective aperture of the host crystal; this facilitates use of an output coupler/Lens with a greater-than-normal curvature, which, in turn, reduces the length of the laser cavity. Moreover, the length of the crystal may be reduced (e.g., from 12 mm to 10 mm) so that the characteristics of the light beam illuminating a recording medium can be controlled by selecting a particular output coupler rather than a particular crystal. A second aperture is desirably disposed between the crystal and the output coupler to reduce the amount of cavity noise and to improve the mode quality (e.g., $M^2$).

When used in recording systems, the light beam emanating from the laser system may be directed at a recording medium in accordance with a predetermined angle of incidence— rather than striking the recording medium perpendicularly— to reduce the amount of back-reflections (which may damage the laser and/or result in undesirable over- or under-exposures of the recording medium) and/or other undesirable interferences (e.g., ionized gas plasma and debris plumes caused by thermal decomposition within the recording medium) that may adversely affect the operation of the laser and reduce the desired image quality. In one particularly advantageous embodiment, the light beam emanating from the laser system onto the recording medium exhibits an incidence angle in the range of about 7.5° to about 10.0° (for infrared (IR) or near-IR wavelengths; this range may vary for ultraviolet or other wavelengths), rather than a more conventional 2° incidence angle. The relatively larger incidence angle protects the laser from undesirable back-reflections, as well as reducing the effects of plume and plasma interference with the beam; it also improves image quality and reduces the requisite imaging power and resulting emissions. As will become apparent to those skilled in the art, plasma/plume shielding using a relatively large incidence angle can be beneficially applied in a wide variety of implementations, such as laser marking, laser engraving, laser milling, etc.

The use of large offset angles is contrary to standard practice. For example, in systems that position the laser beam using a spinning mirror, an increase in offset angle increases the overall width of an internal cylinder imager by the distance from the center of the spinning mirror to the point where the beam hits the cylinder (i.e., distance multiplied by the angle tangent), and distorts the optical spot so it is no longer round. Moreover, larger incidence angles reduce the energy absorbed into the layers of a recording medium, e.g., by increasing reflected energy. For these reasons, the offset angle is typically minimized. It has been found, however, in accordance with the present technology, that the unexpected benefits outweigh the conventional disadvantages.

In one illustrative embodiment, the disclosed technology utilizes diode-pumped solid-state lasers. In such systems, a multimode semiconductor Laser (with a peak wavelength of, e.g., 808 nm) pumps a host crystal, which may be, for example, Nd:YVO$_4$, Nd:GdVO$_4$, Nd:YLF, or Nd:YAG. The host crystal, in turn, converts the highly divergent multimode pump energy to a single-mode laser beam of very low divergence. The laser resonator cavity is defined by optical coatings on opposite faces of the host crystal and an output coupler. Some form of thermal management is ordinarily provided for the host crystal. The laser system may be used, for example, to image ablative/sub-ablative printing members or transfer-type printing members.

In accordance with at least some aspects of the disclosed technology, the output of the pumping source is provided to the Laser crystal via an optical assembly that includes a focusing lens arrangement and a beam divergence-reducing aperture through an optical barrier. The assembly may also include a second beam divergence-reducing aperture between the crystal and the output coupler. This second aperture reduces the pump noise due to power supply-line variances and mode disturbances and also stabilizes the cavity. The beam emerging from the second aperture is provided to an acoustic optical modulator ("AOM") and then the $1^{st}$-order (and/or the $0^{th}$-order) beam, which will be deflected onto the recording medium, and the $2^{nd}$-order beam, which will be discarded, are collimated. The AOM modulates the beam to produce "dot-on-demand" imaging on the printing medium, causing the beam to strike the printing medium only where dots are required in accordance with image data. Placement of the beam on the printing medium is accomplished by a polygonal mirror rotating at a fixed speed based on the imaging resolution.

In ablation-type systems, the beam is focused on the "ablation layer" of the recording material, which is designed to volatilize in response to laser radiation. In transfer-type systems, the beam is focused on the transfer layer. In either case, the depth of focus of the laser beam provides a degree of tolerable deviation. The depth of focus, in turn, is enhanced by using a single-mode laser beam of high quality (i.e., low $M^2$). Accordingly, depth of focus is important in commercial plate-imaging systems, and the present invention provides the necessary depth of focus and beam quality in a small laser package.

The optical components of the disclosed technology may be mounted in a writing head, which may contain multiple such assemblies at evenly spaced intervals. A controller causes relative movement between the writing head and a recording medium, effectively scanning the laser or lasers over the surface, imagewise activating them at positions adjacent to appropriate points or areas of the recording medium. The controller indexes the writing head, after completion of each pass across or along the printing member, a distance determined by the number of beams emanating from the head and by the desired resolution (i.e., the number of image points per unit length). The pattern of laser activation is determined by image signals, provided to the controller and corresponding to the original document or picture being copied onto the recording medium, to produce a precise negative or positive image of that original. The image signals are stored as a bitmap data file on a computer. Such files may be generated by a raster image processor (RIP) or other suitable means. For example, a RIP can accept input data in page-description language, which defines all of the features required to be transferred onto the recording medium, or as a combination of page-description language and one or more image data files. The bitmaps are constructed to define the hue of the color as well as screen frequencies and angles. The components of the disclosed technology can be located on a press, in which case imaged plates are immediately ready for printing; or on a stand-alone CtP plate-maker (or "platesetter"), in which case the imaged plates are removed and manually transferred to a press.

As used herein, the term "plate" or "member" refers to any type of printing media or surface capable of recording an image defined by regions exhibiting differential affinities for ink and/or fountain solution; suitable configurations include the traditional planar or curved (e.g., concave or convex) lithographic plates that are mounted on the plate cylinder of a printing press or a off-press computer-to-plate (CtP) imaging device, but can also include seamless cylinders (e.g., the roll surface of a plate cylinder), an endless belt, or other arrangement.

In general, in one aspect, the invention features an apparatus for imaging a laser-recording medium. The apparatus includes a source emitting a beam of radiation and an optical barrier element with an aperture defined therethrough. The aperture enables transmission of only a portion of the beam, such that the transmitted portion exhibits a reduced divergence relative to the beam incident on the aperture. The apparatus further includes a crystal for receiving radiation exiting the aperture. The crystal forms a single-mode radiation beam having an effective aperture based at least in part on the size of the aperture and on a doping level of the crystal. The apparatus additionally includes an output coupler for receiving the single-mode light beam formed by the crystal and forming a resonator cavity therewith.

In various embodiments of the invention, the radiation beam has a substantially infrared wavelength. Also, the aperture may have a diameter in a range of about 5.0 to 6.5 mm. Further, the crystal may correspond to Nd:YVO4 crystal, an Nd:GdVO4 crystal, an Nd:YLF crystal, and/or an Nd:YAG crystal, as well as have a length of about 10 mm and exhibit a dopant level in a range of about 0.2% to 0.5%. The resonator cavity may have a length in a range of about 50 to 53 millimeters. In some embodiments, the single-mode light beam exiting the output coupler is focused onto a recording medium at an incidence angle in the range of about 7.5 to 10.0°.

In one embodiment of this aspect of the invention, the apparatus further includes a second optical barrier element with a second aperture defined therethrough, the aperture being positioned within the resonator cavity to reduce modal power disturbances and block unwanted modes. The second aperture may exhibit a diameter in a range of about 0.02 to 0.05 inch.

Generally, in another aspect of the invention, the invention features a method of imaging a laser-responsive recording medium, which includes the steps of forming a single-mode light beam and focusing the single-mode light beam onto a desired location of a recording medium at an incidence angle in a range of about 7.5 to 10.0°.

In yet another aspect of the invention, the invention features a method for delivering laser radiation, which includes the steps of emitting a beam of radiation and directing the beam through an optical barrier element with an aperture defined therethrough, such that the aperture enables transmission of only a portion of the beam so as to reduce beam divergence. The method further includes directing the transmitted portion of the beam onto a crystal, which forms a single-mode radiation beam having an effective aperture based at least in part on the size of the aperture and on a doping level of the crystal. The method additionally includes the step of forming a resonator cavity utilizing the single-mode light beam formed by the crystal so as to create a laser output. In various embodiments, the method further includes the step of interposing a second optical barrier element with a second aperture defined therethrough within the resonator cavity to reduce modal power disturbances and block unwanted modes.

The disclosed technology can advantageously be applied to environments other than printing. Virtually any application requiring a high-quality modulated laser beam can benefit from the approach described herein. Such applications include cutting, engraving, marking, soldering, medical therapies, etc.

BRIEF DESCRIPTION OF THE DRAWING

The foregoing discussion will be understood more readily from the following detailed description of the disclosed technology, when taken in conjunction with the single FIGURE of the drawing, which schematically illustrates the basic components of the disclosed technology in a representative implementation.

DETAILED DESCRIPTION

Figure 1:
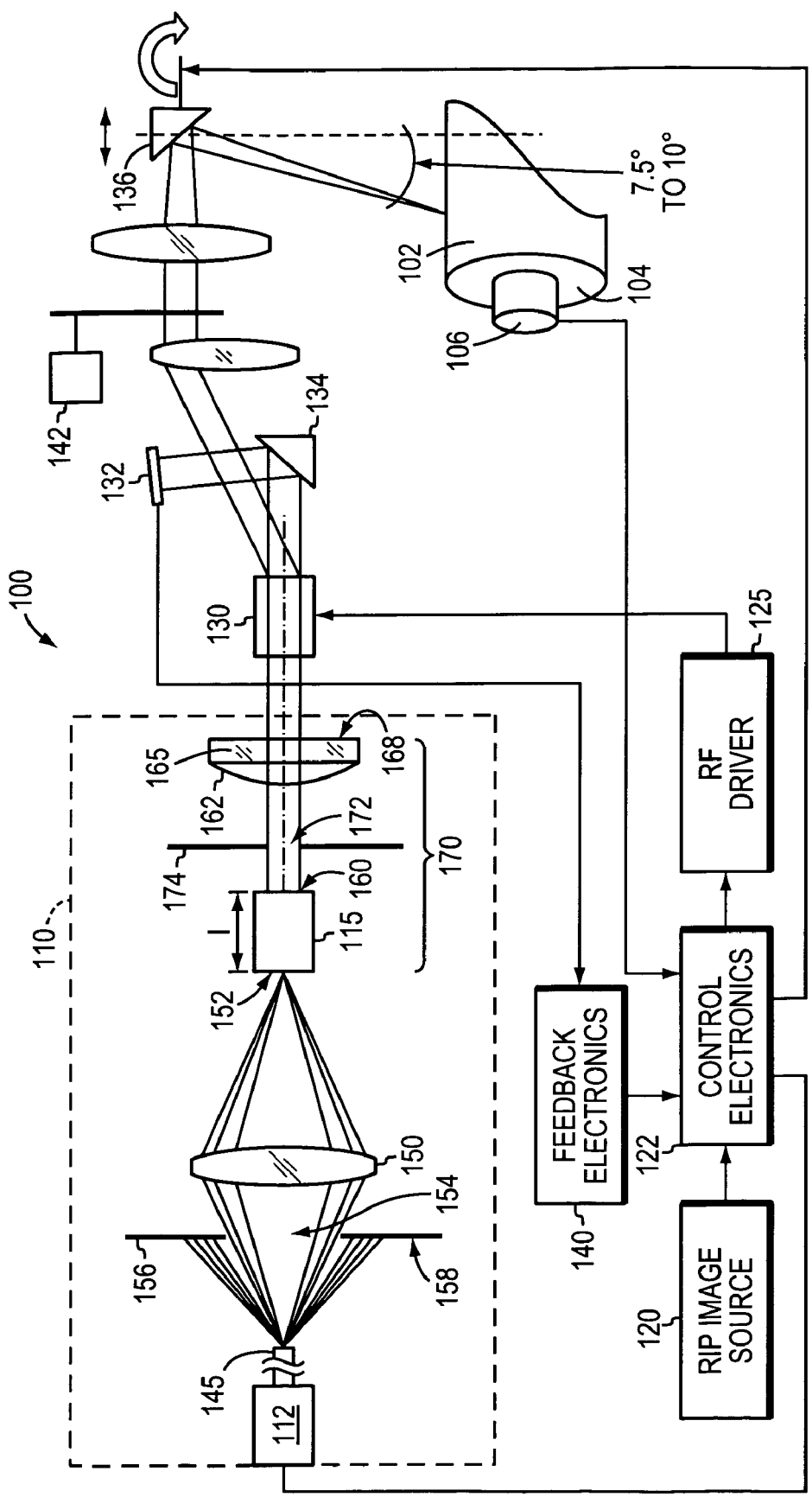

Unless otherwise specified, the illustrated embodiment can be understood as providing exemplary features of varying detail of certain embodiments, and therefore, unless otherwise specified, features, components, processes, modules, data elements, and/or aspects of the illustrations can be otherwise combined, interconnected, sequenced, separated, interchanged, and/or rearranged without departing from the disclosed systems or methods. Additionally, the shapes and sizes of components are also exemplary and unless otherwise specified, can be altered without affecting the disclosed technology.

For the purposes of this disclosure, the term "substantially" is to be broadly construed to indicate a precise relationship, condition, arrangement, orientation, and/or other characteristic, as well as, deviations thereof as understood by one of ordinary skill in the art, to the extent that such deviations do not materially affect the disclosed methods and systems.

In one illustrative embodiment and with reference to FIGURE 1, a laser-ablation/sub-ablation recording system 100, incorporating at least some aspects of the disclosed technology, can be used to image a recording medium 102, such as a lithographic plate blank or other graphic-arts construction, which may be affixed to a support during such imaging. In the depicted embodiment, that support is a cylinder 104 or other suitable configuration, such as the traditional planar or curved support (e.g., concave or convex cylinder), around which or inside of which the recording medium 102 is positioned. If desired, cylinder 104 may be straightforwardly incorporated into the design of a conventional lithographic press or CtP stand-alone device, serving as the plate cylinder. Cylinder 104 is supported in a frame and may, but need not, be rotated by a standard electric motor or other conventional means. If the cylinder is rotating, the angular position of cylinder 104 is monitored by a shaft encoder associated with a detector 106. All or a portion of the optical components of the disclosed technology, described below, may be mounted in a writing head for movement on a lead screw and guide-bar assembly (not shown) that traverses recording medium 102. Axial movement of the writing head results from rotation of a motor (not shown), which turns the lead screw and indexes the writing head after each pass over cylinder 104. If desired, the printing member can instead be mounted on the inside of a stationary cylinder.

Imaging radiation, which strikes recording medium 102 so as to affect an imagewise scan, originates with one or more diode-pumped solid-state laser systems ("DPSS") 110, which includes a pump laser 112 and a host laser crystal 115. The optical components discussed below concentrate the entire laser output onto recording medium 102 as a small feature, resulting in high effective power densities. The DPSS 110 runs at a constant power when in imaging mode. An image-data source (e.g., a computer) 120 provides imaging data to the control electronics 122, which operate an RF modulator driver 125 to produce an imaging burst. The RF driver 125 controls an acoustic optical modulator (AOM) 130, which in turn modulates the laser beam to transfer the image information onto recording medium 102. In particular, when the imaging data dictates writing to the recording medium, AOM 130 deflects the laser beam up into the optical path leading to recording medium 102; when the laser 110 is adjacent to non-image points, by contrast, AOM 130 is not activated, and the beam is directed to a laser power detector 132 via a reflective beam block 134. Additional optical elements not shown, such as a lens between AOM 130 and beam block 134, may be employed as appropriate.

Controller 122 receives data from three sources. The angular position of cylinder 104 with respect to the laser output is constantly monitored by detector 106, which provides signals indicative of that position to controller 122. In addition, image-data source 120 also provides data signals to controller 122. The image data define points on recording medium 102 where image spots are to be written. Controller 122, therefore, correlates the instantaneous relative positions of laser 110 and recording medium 102 (as reported by detector 106) with the image data to actuate RF driver 125 at the appropriate times during scan of recording medium 102. Controller 122 also governs the rotation of a mirror 136, which determines the final placement of the beam on the recording medium 102 and the angle of incidence with respect thereto. The driver and control circuitry required to implement this scheme is well-known in the scanner and plotter art; suitable designs are described in the '092 patent and in U.S. Pat. No. 5,174,205, which is incorporated herein by reference in its entirety. Controller 122 also receives feedback from laser power detector 132. The power detector 132 monitors the output power of DPSS laser 110 and feeds this information to controller 122 via a feedback circuit 140. The controller 122, in turn, adjusts the current to pump laser 112 to maintain constant laser output power. A laser beam attenuator/shutter 142 may be positioned in the optical path leading to recording medium 102. The laser beam will thereby be prevented from reaching the recording medium 102 while nonetheless permitting DPSS laser 110 to remain optically and thermally stabilized for fast response to "on demand" imaging signals. This increases the throughput of CtP off-press imaging devices, as well as the throughput of on-press imaging devices.

The output of laser 112 (which emerges directly or via a fiber bundle 145) pumps laser crystal 115, and it is the emission of crystal 115 that actually reaches the recording medium 102. Various types of laser crystal can serve as host 115 in accordance with the present invention so long as they lase with a suitable conversion efficiency at the desired imaging wavelength and with the desired beam quality. Preferred crystals are doped with a rare earth element, generally neodymium (Nd), and include Nd:YVO$_4$, Nd:GdVO$_4$, Nd:YLF and Nd:YAG crystals.

One or more lenses 150 concentrate the output of laser 112 onto a pump face 152 of crystal 115; for example, the diameter of the beam striking pump face 152 may be 500 μm. Radiation diverges as it exits fiber bundle 145 or laser source 112. Generally the divergence (expressed as a "numerical aperture," or NA) along the short or "fast" axis shown in FIGURE 1 is of primary concern; this divergence can be reduced using a divergence-reduction lens positioned where the beam exits fiber bundle 145 and/or by passing at least part of the light beam emanating from pumping Laser 112 through an aperture 154 defined within an optical barrier 156. If used, the divergence-reduction lens may be, for example, a cylindrical lens, essentially a glass rod segment of proper diameter; however, other optical arrangements, such as lenses having hemispheric cross-sections or which correct both fast and slow axes, can also be used to advantage. The optical barrier 156 can include a highly reflective and/or refractive face 158 that directs unwanted light away from the crystal 115.

Lens 150 focuses radiation emanating from aperture 154 (and/or a divergence-reduction lens) onto the pump face 152 of laser crystal 115. The aperture 154 serves to reduce the M$^2$ of the laser output beam when using short cavity lengths. Generally, pump face 152 of crystal 115 has a mirror coating that permits the entry of radiation from the pumping source 112 of the desired wavelength and reflects the lasing wavelength of the host crystal internally. The other exit surface has an AR coating 160 that allows maximum transmission of the lasing wavelength through the output face of the crystal 115.

The output of crystal 115 strikes the curved face 162 of an output coupler 165, which may be a piano-convex device (as illustrated) or which may assume other geometries. Like face 152 of crystal 115, face 162 receives a mirror coating that reflects a portion of the lasing wavelength, and the two coatings facilitate the internal reflections characteristic of laser amplification. The other exit surface 168 of output coupler 165 has an AR coating that limits surface power losses. In one embodiment, the pump face 152 receives an HR/HT coating, while coupler face 162 receives a PR/HR coating. For example, the coatings may strongly reflect output radiation, thereby trapping it and forming a resonator cavity 170, while transmitting input radiation from pumping laser 112.

Other focusing elements, not shown, deliver the output of host crystal 115 to the recording medium 102 via rotating mirror 136. The rotating mirror may or may not be part of a translating writing head, and its rotation (and, consequently, the locations on medium 102 to which the beam is directed) is governed by controller 122 as discussed above. When the beam strikes recording medium 102, it causes ablation of an imaging layer or transfer of material from a donor to an acceptor sheet. The power output of host crystal 115 may be substantial, e.g., 10 watts or more.

The function of host laser crystal 115 is to produce a low-NA laser beam from the energy provided by the pump laser 112. Generally, crystal 115 is preferably (although not necessarily) a flat-flat monolithic structure of "thermal tensing" material. Optical power delivered to pump face 152 causes opposed faces 152, 160 to deform to a convex surface. As noted earlier, to create a well-defined imaging spot, it is desirable to obtain a single transverse mode of operation (preferably the lowest-order, fundamental TEM$_{00}$ mode), with the output divergence as close as possible to that of a diffraction-Limited source (i.e., M$^2$=1).

A key problem addressed by the present invention is the fact that beam quality tends to degrade as the cavity length is made shorter. Shorter cavity lengths reduce the footprint of the laser imaging assembly, but at the same time beam quality tends to degrade. A high beam quality (e.g., M$^2 \leq 1.25$) and large depth of focus are important for quality imaging in order to accommodate the tolerance stack-ups that characterize commercial imaging systems. The first expedient used to improve beam quality at short cavity lengths is the optical barrier 156 and aperture 154 discussed above. The diameter of aperture 154 can range from, for example, 5.0 to 6.5 mm depending on the divergence of the light exiting pump laser 112. A second expedient is a reduction in the dopant level of crystal 115. Typical dopant levels are on the order of 1%. In accordance with the present technology, however, the dopant level is in the range of about 0.1-0.75%, and preferably about 0.2-0.5%. This reduces the amount of thermal tensing within crystal 115, facilitating shorter cavity lengths through the use of optical couplers 165 having increased curvatures and reduced reflectivity coatings. A third factor in improving beam quality is an aperture 172 defined within laser cavity 170. Specifically, an optical barrier 174 with the aperture 172 therethrough is placed between the host crystal 115 and the output coupler 165. The aperture 172 is just large enough to pass the fundamental (1$^{st}$-order) mode of the laser, while blocking the higher-order modes that degrade the beam quality. In particular, it is recognized that the effective aperture of the crystal 115 is a function of the aperture 154 defined within the optical barrier 126, the dopant level of the crystal 115, and of the intracavity aperture 172. In one illustrative embodiment, DPSS 110 includes an aperture 154 of 6.5 mm (chosen to accommodate the high numerical aperture output of the light coming out of the laser pump source), a dopant level of about 0.5%, and an intracavity aperture 172 having a diameter of 0.031 inch. These parameters facilitate use of a 53 mm cavity at $M^2 \leq 1.25$ and an output level of 10 watts or more.

The length λ of crystal 115 can also be reduced (e.g., from a standard 12 mm to 10 mm to as short as 6 mm) so that selecting a particular output coupler rather than a particular crystal can control the characteristics of the light beam illuminating to recording medium 102. The minimum crystal length is based on a need to remove heat from the crystal during operation. The crystal is metallized and soldered to a housing on the non-pumped surfaces to facilitate thermal conductivity (and heat removal) by direct contact. This reduces bulk and thermal tensing, which improves the quality of the laser beam. Metallizing crystals for heat transfer is known in the art and described, for example, in U.S. Pat. No. 5,822,345, the entirety of which is incorporated herein by reference.

Also in accordance herewith, it is recognized that debris plumes and ionized gas plasma, caused by the thermal decomposition of the targeted sections of the recording medium 102 in response to laser radiation, shield adjacent areas of the targeted sections, resulting in unstable and non-uniform imaging of these areas. In order to address the plasma and/or plume-shielding or optical interference problems encountered during relatively fast imaging, the present invention increases the typical incidence angle of the beam on the printing member from 2° to 7.5° or greater, preferably 7.5% to 10°. This is straightforwardly accomplished simply by adjusting the angle of mirror 136 with respect to the surface of recording medium 102.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An apparatus for imaging a laser-responsive recording medium, the apparatus comprising:
    a source emitting a beam of radiation;
    an optical barrier element with an aperture defined therethrough, the optical barrier element blocking an outer portion of the beam whereby the aperture enables transmission of only an inner portion of the beam therethrough, the transmitted inner portion exhibiting a reduced divergence and a reduced beam quality factor ($M^2$) relative to the beam incident on the optical barrier element;
    a crystal for receiving radiation exiting the aperture, the crystal forming a single-mode radiation beam having an effective aperture based at least in part on the size of the aperture and on a doping level of the crystal;
    an output coupler for receiving the single-mode light beam formed by the crystal and forming a resonator cavity therewith; and
    a second optical barrier element with a second aperture defined therethrough, the second aperture being positioned within the resonator cavity to reduce modal power disturbances and configured to pass the fundamental mode of the light beam while blocking higher-order modes.

2. The apparatus of claim 1, wherein the second aperture exhibits a diameter in a range of about 0.02 to 0.05 inch.

3. The apparatus of claim 1, wherein the radiation beam has a substantially infrared wavelength.

4. The apparatus of claim 1, wherein the aperture has a diameter in a range of about 5.0 to 6.5 mm.

5. The apparatus of claim 1, wherein the crystal corresponds to at least one of an Nd:YVO4 crystal, an Nd:GdVO4 crystal, an Nd:YLF crystal, and an Nd:YAG crystal.

6. The apparatus of claim 1, wherein the crystal exhibits a dopant level in a range of about 0.2% to 0.5%.

7. The apparatus of claim 1, wherein the crystal has a length of about 10 mm.

8. The apparatus of claim 1, wherein the resonator cavity has a length in a range of about 50 to 53 millimeters.

9. The apparatus of claim 1, wherein the single-mode light beam exiting the output coupler is focused onto a recording medium at an incidence angle in the range of about 7.5 to 10.0°.

10. A method of delivering laser radiation, the method comprising the steps of:
    emitting a beam of radiation;
    directing the beam through an optical barrier element with an aperture defined therethrough, the optical barrier element blocking an outer portion of the beam whereby the aperture enables transmission of only an inner portion of the beam therethrough so as to reduce beam divergence and reduce the beam quality actor ($M^2$) of the beam relative to the beam incident on the optical barrier element;
    directing the transmitted inner portion of the beam that has passed through the optical barrier element through a lens and onto a crystal, the crystal forming a single-mode radiation beam having an effective aperture based at least in part on the size of the aperture and on a doping level of the crystal; and forming a resonator cavity utilizing the single-mode light beam formed by the crystal so as to create a laser output.

11. The method of claim 10, further the step of interposing a second optical barrier element with a second aperture defined therethrough within the resonator cavity to reduce modal power disturbances and pass the fundamental mode of the light beam while blocking higher-order modes.

12. The method of claim 11, wherein the second aperture exhibits a diameter in a range of about 0.02 to 0.05 inch.

13. The method of claim 10, wherein the radiation beam has a substantially infrared wavelength.

14. The method of claim 10, wherein the aperture has a diameter in a range of about 5.0 to 6.5 mm.

15. The method of claim 10, wherein the crystal corresponds to at least one of an Nd:YVO4 crystal, an Nd:GdVO4 crystal, an Nd:YLF crystal, and an Nd:YAG crystal.

16. The method of claim 10, wherein the crystal exhibits a dopant level in a range of about 0.2% to 0.5%.

17. The method of claim 10, wherein the crystal has a length of about 10 mm.

18. The method of claim 10, wherein the resonator cavity has a length in a range of about 50 to 53 millimeters.

* * * * *